(12) United States Patent
Kuo

(10) Patent No.: US 7,495,427 B2
(45) Date of Patent: Feb. 24, 2009

(54) AC ELECTRICAL POWER DIVIDING CIRCUIT

(75) Inventor: Heng-Chen Kuo, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 362 days.

(21) Appl. No.: 11/309,670

(22) Filed: Sep. 8, 2006

(65) Prior Publication Data
US 2007/0127176 A1    Jun. 7, 2007

(51) Int. Cl.
*H03H 1/00* (2006.01)
(52) U.S. Cl. ........................ 323/369; 323/364
(58) Field of Classification Search ................ 323/364, 323/369
See application file for complete search history.

(56) References Cited

U.S. PATENT DOCUMENTS 6,822,345 B2 * 11/2004 Gauthier et al. ............... 307/64

FOREIGN PATENT DOCUMENTS

CN        2241926 Y      12/1996

* cited by examiner

*Primary Examiner*—Shawn Riley
(74) *Attorney, Agent, or Firm*—Wei Te Chung

(57) ABSTRACT

An AC electrical power dividing circuit includes a hot line, a neutral line, a ground line, two output ports, a first voltage-dividing module, a second voltage-dividing module, a first sampling resistor, and a second sampling resistor. The hot line is coupled to the ground line via the first voltage-dividing module and the first sampling resistor in turn. The neutral line is coupled to the ground line via the second voltage-dividing module and the second sampling resistor in turn. One of the output ports is connected to a node between the first voltage-dividing module and the first sampling resistor. Another one of the output ports is connected to a node between the second voltage-dividing module and the second sampling resistor. The AC electrical power dividing circuit supplies adjustable AC power to an AC electrical device from a 110 V or a 220V power source.

4 Claims, 2 Drawing Sheets

AC ELECTRICAL POWER DIVIDING CIRCUIT

1. FIELD OF THE INVENTION

The present invention relates to alternating current (AC) electrical power dividing circuits.

2. DESCRIPTION OF RELATED ART

Conventionally power supplies for electronic equipment employ a three-wire AC configuration. Generally, a "hot line" and a "neutral line" to provide electrical power, and a "ground line" thereof is connected to ground, protecting users from being electrocuted.

Among AC power supply systems, 110V and 220V electrical power systems are widely used. The 110V AC electrical power system is a single-phase two-wire-plus-ground (1φ2W+G) system, wherein the voltage carried thereby is 110V with respect to the neutral line. The 220V AC electrical power system includes two different type systems with respect to voltage generation thereof; one is single-phase two-wire-plus-ground (1φ2W+G) system having a hot line carrying 220V voltage, and the other is single-phase three-wire (1φ3W) system, having a hot line (first hot line) and a neutral line (second hot line), each carrying 110V voltage. Different voltage, plug, and socket types are used around the world according to standards defined by International Electrotechnical Commission (IEC) and National Electrical Manufacturers Association (NEMA).

FIG. 2 shows a conventional AC electrical power dividing circuit 10 in an AC electrical device with a hot line L, a neutral line N, a ground line G, and two output ports V+ and V−. The hot line L is coupled to the neutral line N via three resistors Ra, Rb, and Rc in turn. The output port V+ is connected to a node between the resistors Rb and Rc. The ground line G is connected to ground. The resistances of the resistors Ra, Rb and Rc are found using a relationship corresponding to the following inequality: Ra+Rb>>Rc. Therefore, the output voltage of the output port V+ can be varied by adjusting the resistances of the resistors Ra, Rb, and Rc.

However, the AC electrical power dividing circuit 10 can only be coupled to 110V electrical power or a 220V single-phase two-wire-plus-ground. In the event that the AC electrical power dividing circuit is coupled to 220V single-phase three-wire electrical power, the swapping of the neutral line (second hot line) and ground line may occur, presenting an electrocution hazard for individuals, or it may damage internal circuits of precision machines requiring precise power supply.

What is needed, therefore, is an AC power dividing circuit which can be coupled to all types of 110V and 220V AC electrical power sources.

SUMMARY OF THE INVENTION

An AC electrical power dividing circuit includes a hot line, a neutral line, a ground line, two output ports, a first voltage-dividing module, a second voltage-dividing module, a first sampling resistor, and a second sampling resistor. The hot line is coupled to the ground line via the first voltage-dividing module and the first sampling resistor in turn. The neutral line is coupled to the ground line via the second voltage-dividing module and the second sampling resistor in turn. One of the output ports is connected to a node between the first voltage-dividing module and the first sampling resistor. Another one of the output ports is connected to a node between the second voltage-dividing module and the second sampling resistor.

Other advantages and novel features will become more apparent from the following detailed description when taken in conjunction with the accompanying drawings, in which:

DETAILED DESCRIPTION OF THE INVENTION

Figure 1:
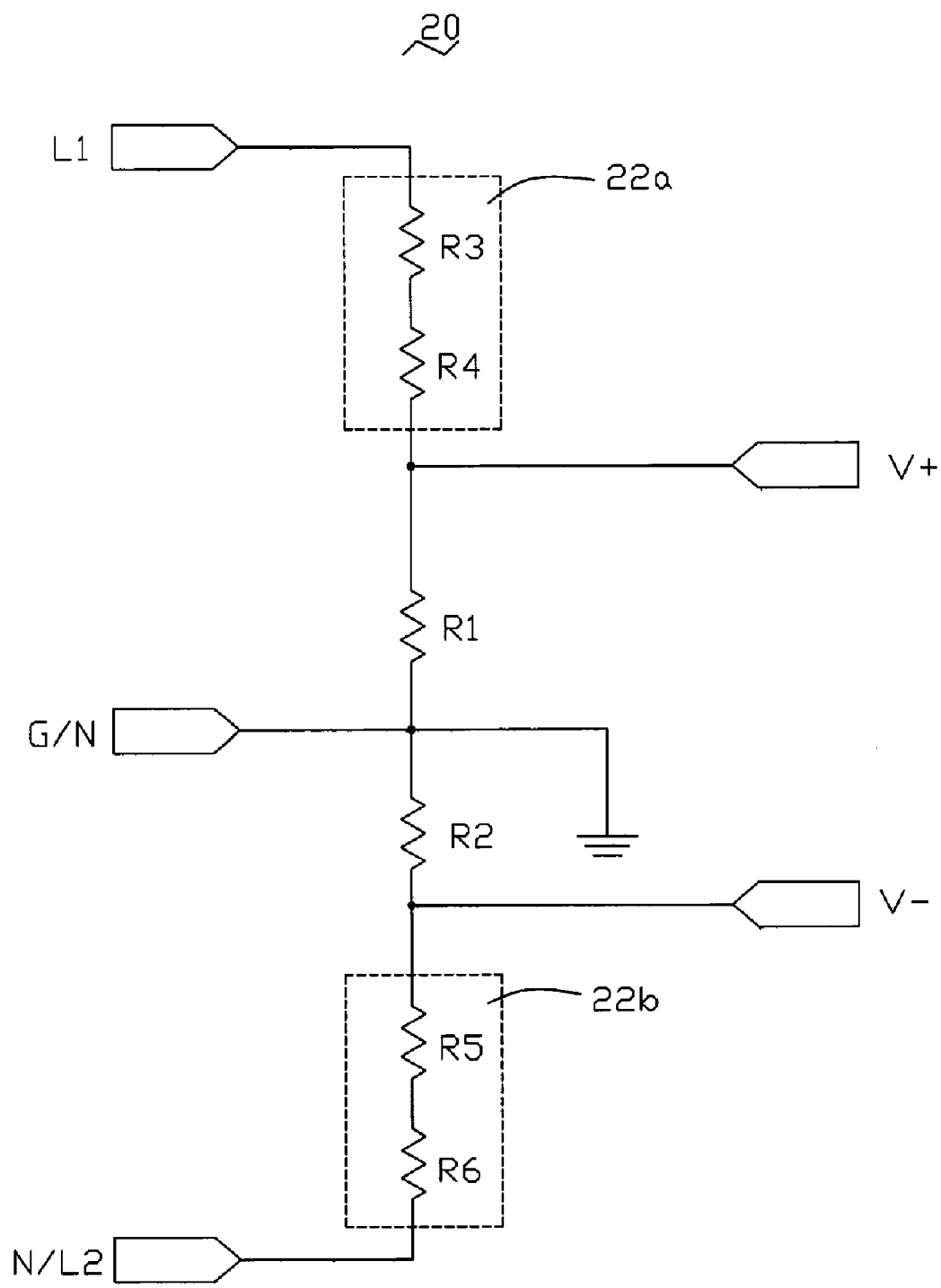
FIG. 1 is a circuit diagram of one embodiment of an AC power dividing circuit in accordance with the present invention.
Figure 2:
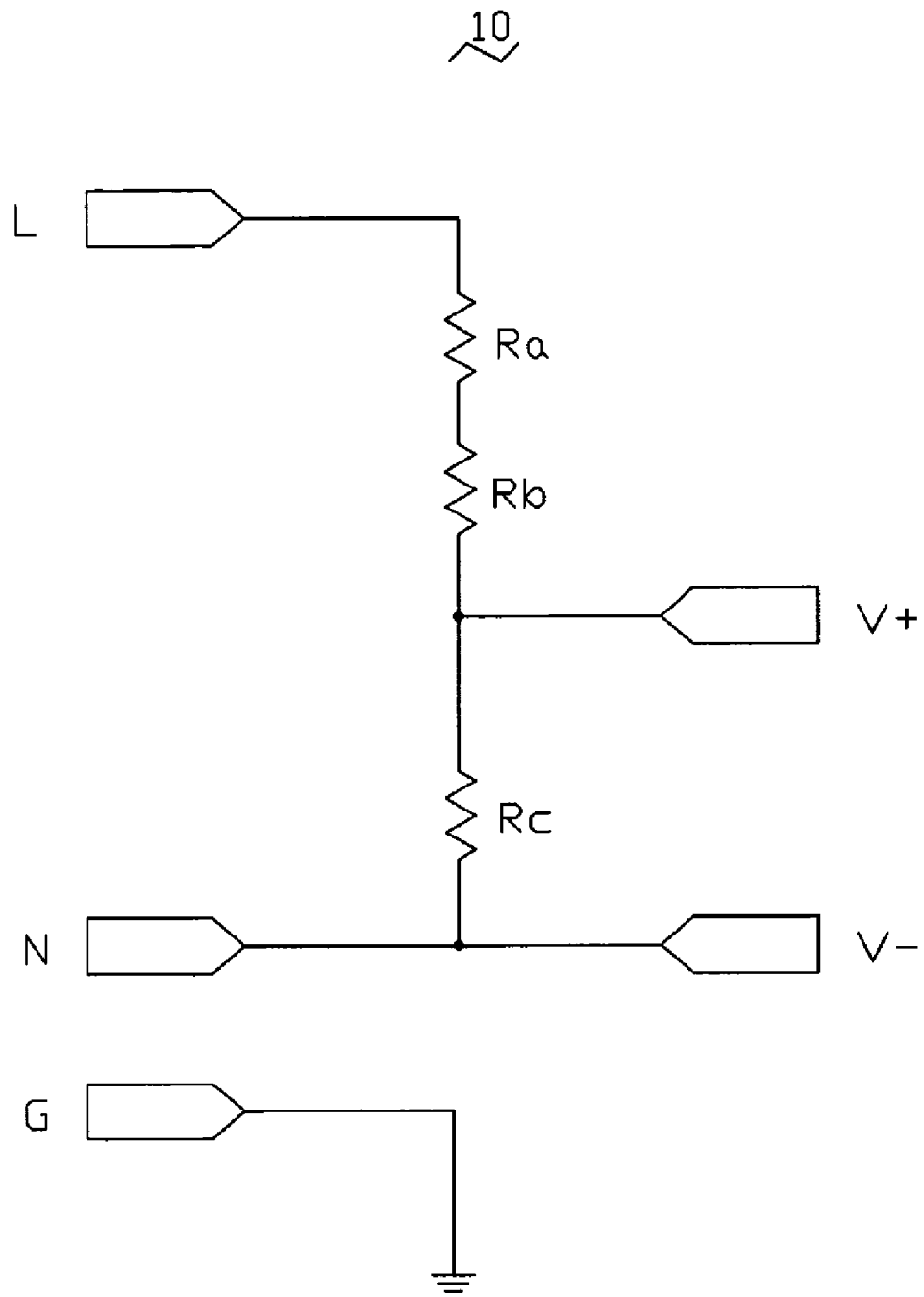
FIG. 2 is a circuit diagram of a conventional AC power dividing circuit.

Referring to FIG. 1, an AC electrical power dividing circuit 20 includes a hot line L1, a neutral line N/L2, a ground line G/N, two output ports V+ and V−, a first voltage-dividing module 22a, a second voltage-dividing module 22b, a first sampling resistor R1, and a second sampling resistor R2. The hot line L1 is coupled to the ground line G/N via the first voltage-dividing module 22a and the first sampling resistor R1 in turn. The neutral line N/L2 is coupled to the ground line G/N via the second voltage-dividing module 22b and the second sampling resistor R2 in turn. The output port V+ is connected to a node between the first voltage-dividing module 22a and the first sampling resistor R1. The output port V− is connected to a node between the second voltage-dividing module 22b and the second sampling resistor R2.

The first voltage-dividing module 22a includes two resistors R3 and R4 connected in series. The second voltage-dividing module 22b includes two resistors R5 and R6 connected in series. The resistances of the resistors R1~R6 are found using a relationship corresponding to following inequalities: R3+R4>>R1, R5+R6>>R2. Therefore, output voltage of the output ports V+ and V− is selectable by adjusting the resistances of the resistors R1~R6.

In the event that the AC electrical power dividing circuit 20 is coupled to a 110V power source or a 220V single-phase two-wire-plus-ground power source, the hot line L1, neutral line N/L2, and ground line G/N are coupled to a hot line, a neutral line, and a ground line of the power source. The AC electrical power dividing circuit 20 output at the output ports V+ and V− is adjustable.

In the event that the AC electrical power dividing circuit 20 is coupled to a 220V single-phase three-wire power source, the hot line L1, neutral line N/L2, ground line G/N are coupled to a hot line (first hot line), neutral line (second hot line), and ground line of the electrical power. The ground line of the 220V power source is coupled to ground by the ground line G/N of the AC electrical power dividing circuit 20. The neutral line (second hot line) is coupled to the output port V− via the second voltage-dividing module 22b. Therefore, the AC power dividing circuit 20 may be coupled to either a single-phase two-wire-plus-ground (1φ2W+G) electrical power system or a single-phase three-wire (1φ3W) electrical power system.

It is believed that the present invention and its advantages will be understood from the foregoing description, and it will be apparent that various changes may be made thereto without departing from the spirit and scope of the invention or sacrificing all of its material advantages, the example hereinbefore described merely being a preferred or exemplary embodiment of the invention.

What is claimed is:

1. An AC electrical power dividing circuit comprising:
a first voltage-dividing module;
a second voltage-dividing module;
a first sampling resistor;
a second sampling resistor;
a ground line;
a hot line coupled to the ground line via the first voltage-dividing module and the first sampling resistor in turn;
a neutral line coupled to the ground line via the second voltage-dividing module and the second sampling resistor in turn;
a first output port connected to a node between the first voltage-dividing module and the first sampling resistor; and
a second output port connected to a node between the second voltage-dividing module and the second sampling resistor.

2. The AC electrical power dividing circuit as claimed in claim 1, wherein the first voltage-dividing module and the second voltage-dividing module each comprise two resistors connected in series.

3. The AC electrical power dividing circuit as claimed in claim 1, wherein the first voltage-dividing module and the second voltage-dividing module have a same resistance, and the first sampling resistor and the second sampling resistor have a same resistance.

4. The AC electrical power dividing circuit as claimed in claim 1, wherein a resistance of the first voltage-dividing module is greater than a resistance of the first sampling resistor.

* * * * *